United States Patent Office 3,347,137
Patented Oct. 17, 1967

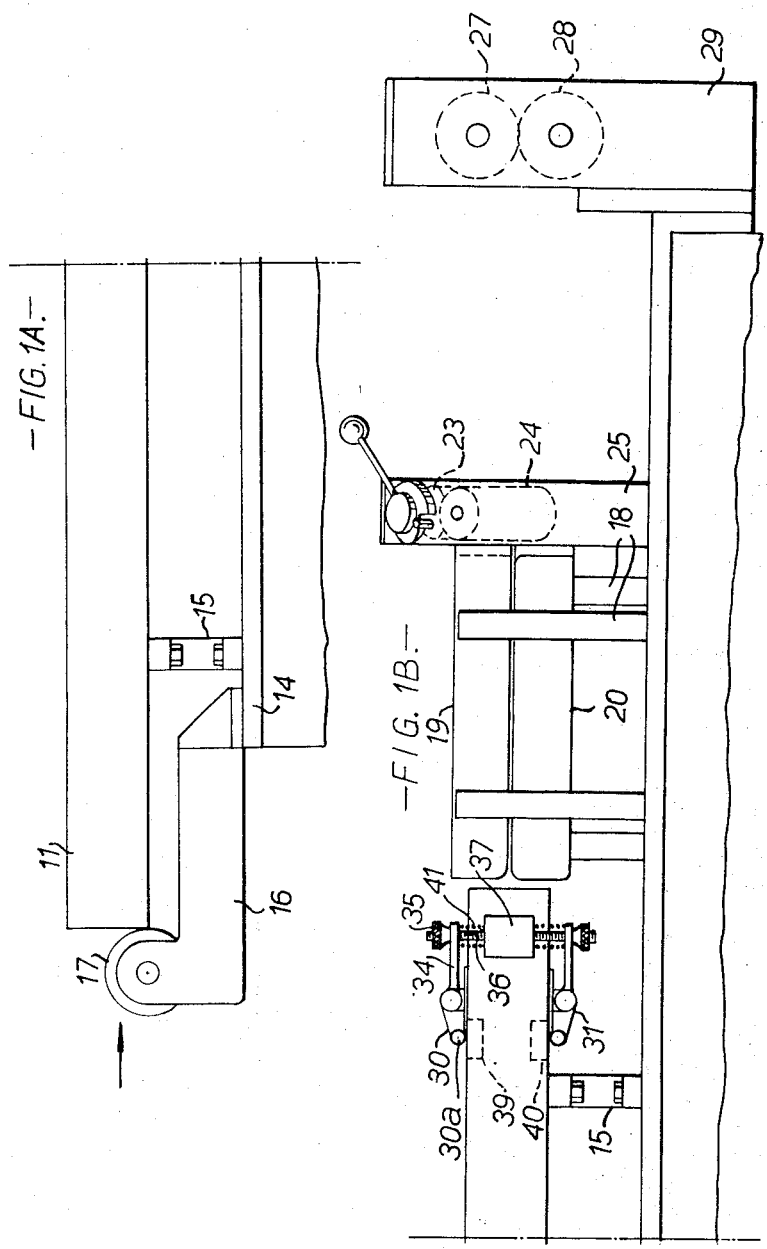

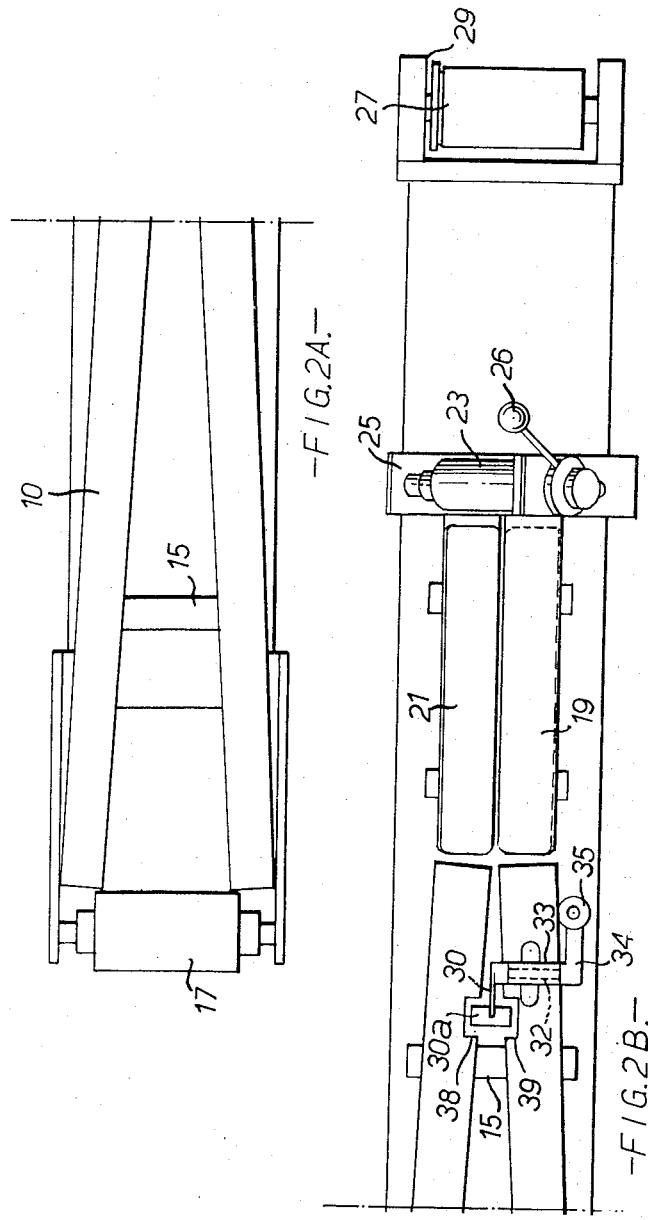

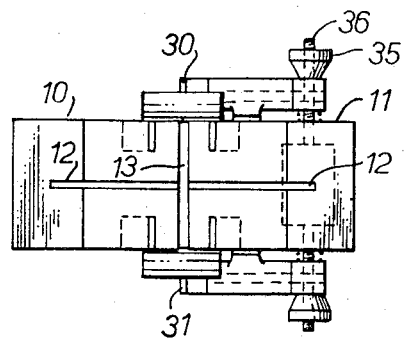
–FIG. 3.–
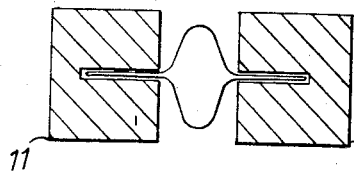
–FIG. 4a.–
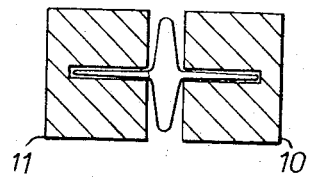
–FIG. 4b.–
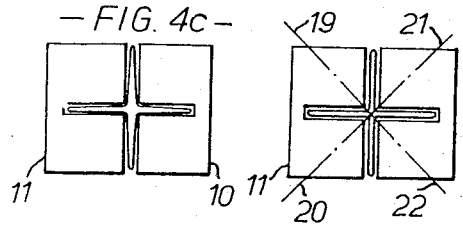
–FIG. 4c–
–FIG. 4d.–
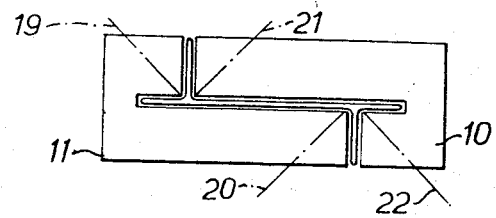
–FIG. 5.–

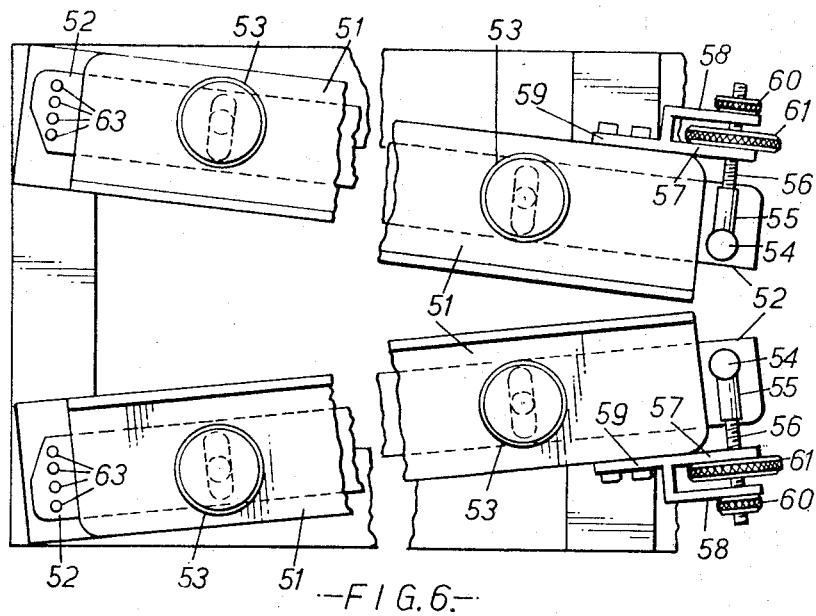
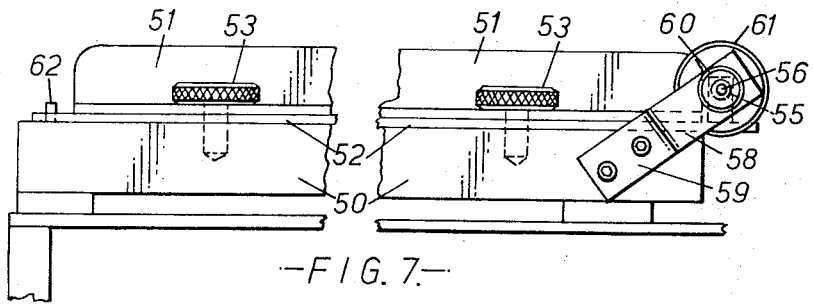

3,347,137
METHODS AND APPARATUS FOR FORMING GUSSETS IN FLEXIBLE TUBULAR MATERIAL
Ronald William Barraclough, Southport, England, assignor to R. W. Barraclough Limited, Southport, England, a British company
Filed July 1, 1965, Ser. No. 468,907
Claims priority, application Great Britain, July 14, 1964, 29,197/64
12 Claims. (Cl. 93—20)

The present invention relates to methods and apparatus for forming gussets in flexible tubular material.

Gusseted tubular material is used to a large extent in the packaging industry, particularly for forming containers for liquids or solid particulate substances, the gusseted material frequently being fed to a machine which forms the containers, fills and seals them and finally discharges them. In order for the machine satisfactorily to perform these operations, the gusseted material must be accurately manufactured and in particular care must be taken to ensure that the outer edges of the gussets are in exact register with one another.

Known practise in the manufacture of gusseted tubular material has been to form the gussets during the extrusion of the material. However this method does not give a consistently accurate product and further the faces of the tubing are not sufficiently even to take printing satisfactorily.

The main object of the present invention is to provide an improved method and apparatus for forming gussets in flexible tubular material.

According to one feature of the invention, the method of forming gussets in a length of flat flexible tubular material comprises the steps of feeding the flat tubular material to a converging die, drawing the tubular material through the die to progressively deform the plane faces of the tubular material intermediately of edge portions thereof, the deformation being outwardly and oppositely of the plane faces of the tubular material and folding the deformed portions over said edge portions to form gussets therewith.

According to another feature of the invention, apparatus for forming gussets in a length of flat flexible tubular material, comprises a die formed of two converging members provided with first slots extending inwardly of the members from facing surfaces of the members, the spacing between the blind ends of the slots at one end of the members being substantially equal to the width of the flat tubular material while at the other end the facing surfaces of the members converge to form second slots perpendicular to the first slots and on opposite sides of the plane faces of the tubular material whereby when the tubular material is drawn through the die, the plane faces of the material are deformed between the facing surfaces of the members to form gusset sides extending oppositely from said plane faces and folding arrangements to which the tubular material issuing from the die is fed and which serve to fold the gusset sides over edge portions of the tubular material to form the gussets.

The invention will be better understood from the following description of two embodiments taken in conjunction with the accompanying drawings comprising FIGS. 1 to 7. In the drawings:

FIGS. 1a and 1b when placed side-by-side with FIG. 1a on the left show a side elevation of the apparatus, FIGS. 2a and 2b when placed side-by-side with FIG. 2a on the left show a plan view, FIG. 3 is a partial end view looking in the direction of the arrow in FIG. 1, FIG. 4 shows various stages in the formation of the gusset sides, FIG. 5 shows an alternative form of die, FIG. 6 shows a plan view of the second embodiment, and FIG. 7 shows a side elevation of the second embodiment.

Briefly, the method employed is to feed the tubular material in the flat into a die which forms in each plane face of the material a gusset side extending outwardly from the plane face. When so shaped, the material is fed through pressure rollers which press the gusset sides to lie over the plane face of the material thereby forming the gusset.

Referring to the drawings and particularly to FIGS. 1, 2 and 3, the die consists of two rectangular members 10, 11 each provided with a transverse slot 12. The rectangular members are spaced apart at one end such that the distance between the blind ends of the slots is substantially equal to the width of the tubular material when flat. From this end the rectangular members converge to form a further slot 13 which is at right angles to the transverse slots. The die opening in this embodiment is therefore in the form of a cross so that the depth of each gusset is one half the width of the gusseted tube.

The rectangular members are mounted on a suitable base plate 14 by means of a support member 15 and the base plate is also provided with a mounting 16 for a roller 17 over which the tubular material is fed, for example from a reel. Also mounted on the base plate by means of suitable supporting posts 18 are four shaping plates 19, 20, 21 and 22 (FIG. 4d). These four plates are arranged in the form of a cross about the centre of the die opening but they are displaced by 45 degrees from the slots forming the die opening as shown in FIG. 4d.

Following the shaping plates, a pair of pressure rollers 23 and 24 are mounted on the base plate by means of the structure 25, the nip of the rollers being at 45 degrees to the horizontal i.e., 45 degrees to the plane of the tubular material as it is fed into the apparatus. Suitable means, controlled by the operating handle 26, are provided for separating the rollers 23 and 24. Finally a pair of driven rollers 27 and 28 having the nip horizontal are provided in the mounting 29 which is also secured to the base plate.

In operation, the tubular material is inserted flat in the transverse slots 12 in the two members 10 and 11 at their divergent or input ends. It is then drawn through the die at the convergent or output ends of the members 10 and 11. During the passage of the material along the two members 10, 11 the plane faces of the material are progressively deformed as shown in FIGS. 4a, 4b and 4c, it being ensured that the deformation is outwardly of the plane faces. It will be understood that FIGS. 4a and 4b are diagrammatic cross-sectional views at different points along FIG. 1 while FIG. 4c is an end view looking from the right-hand side of FIG. 1. As the material is drawn through the die, therefore, it is deformed into the shape of a cross and it is then passed between the shaping plates 19, 20, 21 and 22 as shown in FIG. 4d in order to crease the material at the bases of the arms of the cross. Finally the deformed material is fed between the pressure rollers 23 and 24 which fold together adjacent arms of the cross to give the gusseted tubing. This is then passed between the driven rollers 27 and 28 and either wound on to a reel or fed directly to a machine for forming containers from the gusseted material.

It is found that in operation the vertical arms of the cross tend to rise too high in the vertical slots in the die so that the horizontal arms are withdrawn from the blind ends of the transverse slots, which results in the inaccurate register of the outer edges of the gussets. In order to avoid this difficulty a control device is incorporated and consists of two adjustable arms 30 and 31 which are positioned above and below the vertical slot adjacent the die head, the arms being terminated in cross members such as 30a. Cut-outs 38, 39, 40 are provided in the members 10, 11 to accommodate the cross members. Each arm is secured to one end of a spindle 32 (for the arm 30) and this passes through a bearing 33 secured to the upper surface of member 11. The other end of the spindle carries a forked arm 34, the fork on which engages with an adjustable nut 35 on a threaded spindle 36 fixed in the block 37 which is itself secured to the side face of member 11. The arm 34 is urged in a counter-clockwise direction by the spring 41. It will therefore be understood that adjustment of the nut 35 along the threaded spindle 36 inserts or withdraws the arm 30 into the space between the two members 10 and 11. A precisely similar adjusting arrangement is employed for the arm 31, the block 37 being common to both arrangements. By suitable adjustment of the arms 30 and 31, the vertical arms of the cross are prevented from rising too high.

As previously mentioned, the apparatus described produces a gusseted tube in which the depth of the gusset is half the width of the gusseted tube. It is, however, possible to produce gusseted tubing where the depth of the gusset is any desired relation to the width of the gusseted tube. This can be done by suitably shaping the members 10 and 11 and FIG. 5 shows one way of doing this, the dotted lines indicating the position of the shaping plates.

It will also be noted that the embodiment shown can only deal with tubular material of one width but the apparatus can easily be modified to take material of different widths by providing means for adjusting the spacing between the members. A second embodiment which includes such adjusting means is shown in FIGS. 6 and 7. The whole of the apparatus is not shown in these drawings since the general arrangement is the same as that shown in FIGS. 1 and 2, only the adjusting means at the inlet and outlet ends of the members 10 and 11, being shown in FIGS. 6 and 7. Briefly the difference between the embodiment shown in FIGS. 6 and 7 and that shown in FIGS. 1 and 2 is that the two members 10 and 11 (FIGS. 1 and 2) each consist of two parts with a spacer between them to define the slot, the spacer being adjustable between the two parts to vary the depth of the slot so as to enable the apparatus to be adjusted for tubular material of different widths.

Referring to FIGS. 6 and 7, each of the two converging members are formed in two parts 50, 51, one of which, 50, is of rectangular shape while the other, 51, has an L-shaped section. The parts 50 are mounted on supporting members similar to the supporting members 15 of FIGS. 1 and 2. The two parts 50 and 51 are separated by a spacer 52 and the three components are secured together by circular headed bolts 53 each of which passes through a hole in the part 51 and a slot in the spacer 52 into a tapped hole in the part 50. At the outlet end the spacer 52 extends beyond the two parts 50, 51 and carries a pivoted pillar 54 to which is secured an internally threaded sleeve 55 for the reception of a correspondingly threaded spindle 56. The spindle 56 passes through the forked arms 57, 58 of a bracket 59 bolted to the part 50, the spindle terminating in an adjusting screw 60. A threaded lock nut 61 is also mounted on the spindle 56 between the forked arms 57, 58. It will be understood that similar adjusting arrangements are provided for both members.

At the inlet end of the two members, the part 50 extends beyond the part 51 and has a fin 62 secured to its upper surface. The spacer 52 also extends beyond the part 51 and has a row of transverse holes 63 at the end region, the holes being spaced at distances of, for example, ¼ inch. The spacer 52 is positioned so that the fin 62 enters one of the holes, the one chosen being determined in accordance with the width of the tubular material.

In order to adjust the apparatus to accommodate a different width of tubular material, the bolts 53 are first slackened and the two spacers are lifted off their fins and replaced so that the fins pass through holes appropriate to the new width. This adjustment need not be accurate but must be such that the distance between the two spacers is not less than the desired width of material. The lock nuts 61 are now slackened and the adjusting screws 60 actuated until the distance between the two spacers is accurately equal to the width of the final gusseted tubing and so that edges of the spacers are equally disposed about the centre line of the converging members. The lock nuts 61 and the bolts 53 are then tightened.

Other modifications may also be made to the apparatus. For instance, the rollers 23 and 24 may be driven rollers and rollers 27 and 28 be replaced by an idler roller. Further a separate control device may be provided for the top and bottom of the vertical slot.

It will be understood that feeding the end of the tubular material manually through the apparatus need only be undertaken when the appartus is first set up and when one reel of tubular material has passed through the apparatus the leading end of a new reel can readily be joined to the end of the existing reel. It will also be appreciated that a quantity of air is trapped within the tubular material during its passage through the machine. It is found that some of the trapped air escapes during the operation of the apparatus so that there is a tendency for the tubular material to collapse slightly. In general, the amount of air escaping is small and recharging when jointing the succeeding length of tubular material is sufficient. However, it may be necessary to add air during operation and this may be done, for instance, by a hypoderimc needle connected to an air supply, with the loss of one container length of gusseted material.

One of the advantages of the present invention is that it enables gusseting of the tubular material to be effected at the place where it is to be used. Previously, where gusseting was effected at the extrusion stage, the gusseted tubing was wound on to reels and transported as required to the place where it was to be used. However, gusseted tubing takes up considerably more space than flat tubing and storage can then become a problem.

What is claimed is:

1. Apparatus for forming gussets in a length of flat flexible tubular material comprising a die consisting of first and second members mounted to converge towards one another, said first and said second member having first slots extending inwardly of the members from facing surfaces of said members, the spacing between the blind ends of the slots at the inlet end of said members being substantially equal to the width of the flat tubular material while at the outlet end the facing surfaces of said members converge to form second slots perpendicular to said first slots and on opposite sides of the plane faces of the tubular material, means for drawing the tubular material through said die to deform the plane faces of the material between the facing surfaces of the members into gusset sides extending oppositely from said plane faces and folding means whereby the gusset sides of the tubular material issuing from said die are folded over edge portions of the tubular material to form the gussets.

2. Apparatus as claimed in claim 1 and including shaping members located between said die and said folding arrangements whereby the material at the base of each gusset side is creased.

3. Apparatus as claimed in claim 2, wherein said shaping members consist for reach gusset sides of two plates perpendicular to one another and at an angle of 45 degrees to the slots in said die, adjacent edges of the two plates being separated by a distance sufficient to effect the required creasing action.

4. Apparatus as claimed in claim 1 and including a control device for equalising the gusset sides with the edge portion of the tubular material.

5. Apparatus as claimed in claim 4, wherein said control device comprises a pair of arms operating in recesses formed in opposite sides of said converging members, said arms extending into said second slots transversely to the direction of movement of the material and defining the distance to which the gusset sides rise in said second slots.

6. Apparatus for forming gussets in a length of flat flexible tubular material comprising a die consisting of first and second members mounted to converge towards one another, said first and said second members having first slots extending inwardly of the members from facing surfaces of said members, the spacing between the blind ends of the slots at one end of said members being substantially equal to the width of the flat tubular material while at the other end the facing surfaces of said members converge to form second slots perpendicular to said first slots and on opposite sides of the plane faces of the tubular material, means for drawing the tubular material through said die to deform the plane faces of the material between the facing surfaces of said members into gusset sides extending oppositely from said plane faces, shaping members for creasing the tubular material at the base of each of the gusset sides, folding means whereby the gusset sides of the tubular material issuing from said die are folded over edge portions of the tubular material to form the gussets and a control device for equalising the gusset sides with the edge portions of the tubular material.

7. Apparatus as claimed in claim 6, wherein said shaping members consist for eacht gusset side of two plates perpendicular to one another and at an angle of 45 degrees to the slots in the die, adjacent edges of the two plates being separated by a distance sufficient to effect the required creasing operation.

8. Apparatus as claimed in claim 4, wherein said control device comprises a pair of arms operating in recesses formed in opposite sides of said converging members, said arms extending into said second slots transversely to the direction of movement of the material and defining the distance to which the gusset sides rise in said second slots.

9. Apparatus as claimed in claim 8, and including means for adjusting the amount by which said arms extending into said second slots.

10. Apparatus as claimed in claim 6, wherein each of said first and second converging members comprises first and second cooperating parts, spacing means and means securing said spacing means between said first and second cooperating parts to form said first slot.

11. Apparatus as claimed in claim 10, and including means for adjusting the position of said spacing member relative to said first and second cooperating parts.

12. Apparatus as claimed in claim 11 and including first adjusting means for enabling an approximate adjustment at the inlet end of said first and second converging members and second adjusting means for enabling an accurate adjustment at the outlet end of said first and second converging members.

References Cited

UNITED STATES PATENTS 2,631,332   3/1953   Reber _____ 18—19

BERNARD STICKNEY, *Primary Examiner.*

ROBERT F. WHITE, *Examiner.*

R. KUCIA, *Assistant Examiner.*